United States Patent Office 3,000,829
Patented Sept. 19, 1961

3,000,829
COMPOSITION AND PROCESS FOR DESCALING METAL PARTS
Benjamin Arden, Los Angeles, Calif., assignor, by mesne assignments, to Purex Corporation, Ltd., a corporation of California
No Drawing. Filed June 12, 1958, Ser. No. 741,475
12 Claims. (Cl. 252—103)

This invention relates to removal of deposits on metal parts. A particularly important application of my invention is the removal of heat scale or oxide scale formed at high temperatures, from metal parts such as iron and steel. This invention is concerned with novel procedure and compositions for the removal of such deposits.

This application is a continuation-in-part of my copending applications Serial Nos. 511,096 and 511,098, now Patent No. 2,843,509, both filed May 25, 1955.

One important present application of my invention is to power plants of modern aircraft, particularly jet engines, such as turbojet and turboprop power plants, which are constructed from special heat resistant alloys and super-alloys. During service the various component parts are exposed to high operating temperatures in the vicinity of 800–1800° F. or even higher. At these elevated temperatures the metal alloys are exposed to both reducing and oxidizing atmospheres at various times and, as a result, very tightly adherent scale deposits are formed on the hot parts of the engine.

Examples of components of jet engines which are covered with scale deposits are the combustion chamber inner liner, cross-ignition tubes, transition liner, turbine nozzle assembly, and turbine rotor assembly (with attached buckets), exhaust components, and, in some models, the after burner.

The chief alloys used for jet engine components and on which the above-noted scales or deposits are formed include stainless steels, e.g., of the straight chrome type (martensitic or ferritic), austentic stainless steels, stainless steels of the chromium or chromium-nickel type, and heat resistant alloys and super-alloys including nickel base and cobalt base alloys, iron-chromium-nickel alloys, and cobalt-nickel-chromium alloys. These belong to the general classification of heat resistant alloys. The aforementioned deposits may also be formed on other types of alloys. These deposits, the heat scale or obdurate oxide deposits, are thus to be distinguished from ordinary rust produced by corrosion of mild steel and iron in their physical and chemical nature and are much more refractory and difficult to remove by alkaline reagents. For example, in the case of Inconel (a nickel base alloy) it appears most probable that the heat scale is largely a mixture of oxides with nickel oxide the major component. On stainless steels, the initial scale formed may be of the nature of an iron oxide-chromic oxide spinel. Also formed on the metal surfaces of aircraft engine parts during service are smut deposits. These hot scale deposits are fused oxide layers of refractory nature and highly resistant to chemical and mechanical attack.

Also formed on the surface of the engine parts is a tough carbon or graphite scale which tightly adheres to the metal surfaces. In describing these scales as carbon or graphite scales I do not exclude the presence in the carbon deposits of high molecular weight asphaltene or asphaltic or tarry binders which are formed in the burning of the fuel. These deposits are found both intermingled with and deposited on the heat scale and leaded deposits. In many cases massive carbon deposits are formed because of severe conditions of engine operation, especially in the case of "hot" spots. The heat scale formed on components of jet engines and other types of engines operating at high temperature under oxidizing conditions is a scale of oxide character known as "heat scale," which is deposited because of high temperature oxidizing conditions. Thus, at high temperatures of operation, e.g., existing in operation of jet engines, a heat scale is formed which is largely a mixture of the oxides of the metals or of the metal alloys of which the engine parts are constructed. The relative proportions of the various oxides of which such heat scale is composed may approach but need not correspond exactly with the percentages of the parent metals in the alloy.

For proper maintenance of the engines, overhaul procedures must be applied during which the engine components are completely and safely cleaned of heat scale deposits and any other contamination which may be present such as leaded deposits and deposits of carbon. One of the most important reasons for removing the foreign matter and scale deposits is to provide clean metal surfaces which are suitable for inspection for flaws by standard techniques. Inspection is especially important for jet engine parts which are highly stressed, such as nozzle guide vanes and turbine buckets.

Conventional procedures for cleaning jet engine hot section components during overhaul are based on a combination of inadequate chemical cleaning methods plus mechanical cleaning, which includes grit blasting and liquid honing (or vapor blasting). Thus, for example, a conventional procedure may include use of a chlorinated solvent, either hot or cold, followed by a caustic dip, then a permanganate treatment, and finally vapor or sand blasting. However, these procedures have proved inadequate.

In oxidizing atmospheres obdurate, adherent oxide scale deposits are formed on the various alloys which require prolonged immersion times in a series of chemical bath to effectively remove the scale deposits, and provide clean parts for inspections.

One object of the invention is to remove heat scale deposits formed on engine components, particularly, but not exclusively, the "hot" sections of aircraft engines, especially jet engines.

Another object is to devise a procedure and compositions for the efficient removal of oxide deposits in the form of heat scale from parts carrying the same.

Still another object is to provide procedure and compositions for cleaning surfaces of metal components of engines, particularly aircraft engines, encrusted with oxide deposits or heat scale, to enable suitable inspection of the parts by production-line methods utilizing penetrant dyes or fluorescent materials.

A still further object of the invention is the provision of a method and compositions for accomplishing such descaling without producing any substantial or even measurable corrosion of the metal part during the cleaning or descaling cycle, so as to incur no significant weight loss or dimensional change of the metal or alloy of which the engine component is formed.

Yet another object is to devise procedure and compositions adapted to remove, particularly, heat scale deposits from engine parts, while at the same time achieving removal of carbon deposits if present.

A particular object is to afford a method and composition effective as a conditioner or auxiliary bath, prior to application of an acid bath, for dissolving oxide scale formed on engine components at high temperatures and oxidizing such scale to a higher valence state, to render such oxide deposits readily removable by a subsequent acid treatment or other treatment.

A still further object is the provision of such an auxiliary bath employed in conjunction with and subsequent to treatment with an alkaline bath, particularly the alkaline bath containing complexing agent and alkanolamine of my aforementioned copending applications, to provide efficient loosening and removal of heat scale, together with other deposits such as carbon deposits.

Other objects and advantages will be apparent from the description of my invention which follows:

I have found that these deposits, in the form of heat scale, can be removed readily from engine parts, such as jet engine "hot section" components, by treatment of such parts in an alkaline solution at elevated temperature and containing an alkali, e.g., sodium hydroxide, an alkaline metal permanganate, e.g., potassium permanganate, and a water soluble fluoride, such as sodium fluoride. This alkaline fluoride-containing permanganate bath of the present invention is substantially non-corrosive to the alloys and metals generally used in constructing engine parts, particularly jet aircraft components.

The instant fluoride-containing alkaline permanganate bath is particularly useful and effective for removing a substantial proportion of heat scale and conditioning and loosening the remainder of the heat scale, when such bath is employed as an auxiliary bath in conjunction with and subsequent to the alkaline solution of my above copending application, e.g., Serial No. 511,096, when the engine parts containing heat scale are first treated in the latter solutions prior to treatment in the alkaline permanganate-fluoride solutions of this invention. The alkaline solutions of my copending application contain a high concentration of alkali, a polyalkanolmonoamine to which may be added a polyalkanolpolyamine, and when used to remove heat scale may employ also a salt of a hydroxy aliphatic acid or sometimes, depending on the function desired, a low molecular weight fatty acid.

By treating engine parts contaminated with heat scale, as described above, in the alkaline permanganate solutions or compositions of the invention, a substantial proportion of the oxide heat scale is removed and the remainder is conditioned so as to provide substantially complete removal of this scale in a relatively short period when the parts are subsequently treated, e.g., in an acid bath, such as nitric acid.

When the engine parts encrusted with heat scale are pretreated in the aforementioned alkaline solution of my copending application, followed by further treatment and conditioning of the heat scale in the alkaline permanganate solutions of the present invention employing a water soluble fluoride, and preferably followed by treatment in an acid or alkaline solution for complete removal of loosened and conditioned heat scale, such heat scale is removed more rapidly and efficiently, or a greater percentage of heat scale is removed for a given time, than when employing the same procedure but using a conventional alkaline permanganate solution not containing a fluoride.

However, it is to be understood that the alkaline permanganate solution containing fluoride of the instant invention can be employed separately to produce improved results without the prior conditioning treatment employing the highly alkaline solutions of my above copending application, as noted by the example below. In preferred practice, however, it is desirable for most effective operation to pretreat the heat scale in the alkaline solutions of my copending application.

The aqueous alkali solution of the invention contains, as its alkalinity producing agent, an alkali metal compound which in solution gives free alkali metal hydroxide which may be potassium or sodium hydroxide. A substantial amount of alkali of this type is employed in order to attain the high pH values necessary for proper functioning of the solution. The pH of the heat scale conditioner solution hereof is maintained substantially above 12, and is generally not less than about 13. Solutions of alkali which are preferred have values of the pH of the solution above about 13, and may be 14 or even higher. Actually, at such high pH values, it is more common practice to describe the alkalinity in terms of percent sodium hydroxide or potassium hydroxide or some other equivalent metal hydroxide. The amount of alkali metal hydroxide employed may range from about 1 to about 25% by weight of solution, preferably from about 10 to about 25% by weight of solution.

I may also incorporate alkali metal carbonate, e.g., sodium or potassium carbonate, in my heat scale conditioner composition although this material is not essential. The alkali metal carbonate is generally used to control the hardness of the water. The amount of alkali metal carbonate employed is from 0 to about 15%, generally in the range of about 5 to 15% based on the weight of the solution.

As the second essential component of my heat scale conditioner solution I employ any soluble permanganate such as the alkali metal permanganates, e.g., sodium and potassium permanganates, or other soluble permanganates such as calcium permanganate. Preferably I utilize the alkali metal permanganates, most desirably potassium permanganate. The amount of the permanganate employed can be in the range of about 0.4 to about 12% by weight of the solution, preferably about 3 to about 9%. The permanganate functions in the highly alkaline solution as the chief oxidizing agent for the heat scale, to condition the latter to a more highly oxided form.

As the third essential component of my heat scale conditioner, I preferably employ a water soluble inorganic fluoride derived from any source which produces fluoride ion in strong alkaline solution. Thus, I may use simple fluorides such as the alkali metal fluorides, e.g. sodium or potassium fluorides, or ammonium fluoride, or I can employ complex fluorides such as fluoborates and silicofluorides, e.g., sodium, potassium or ammonium fluoborates or silicofluorides. These complex fluorides decompose in the alkaline-permanganate system to produce the fluoride ion in the solution. The amount of fluoride which I employ is generally in the range of about 1 to about 8% by weight of the solution, usually about 2 to about 6%. However, for any specific fluoride ion source employed, it is preferred not to employ an amount substantially greater than the amount which is soluble in the particular alkaline permanganate solution utilized.

The parts containing oxide heat scale are immersed in my alkaline permanganate-fluoride containing solution maintained at a temperature generally in the range of about 180 to about 220° F., preferably 190 to 210° F., but this temperature is not critical. Time of treatment is from say about 15 minutes to about 1½ hours where pretreatment with the highly alkaline solutions of my copending application is employed prior to use of the permanganate-fluoride bath. Longer periods may be required where my permanganate-fluoride solution is used without other alkaline treatment. The parts are then removed, rinsed by dip or spray with water and then treated preferably in acid solution as described below to remove the heat scale loosened and conditioned in my alkaline permanganate bath containing fluoride.

My alkaline permanganate bath can be made up from the individual components added separately to the required amount of water to produce the concentrations of the essential components noted above. Alternately, two or more of the components of my composition can be combined in solid or powder form and added to water to make up the solution. According to the latter procedure, the proportions of each of the components present in the solid composition are such that when the solid composition is added to water in an amount of 4 to 64 ounces per gallon of solution, the components are present in the solution within the ranges set forth above. Generally, the percentage of alkali metal hydroxide present in the solid composition is about 15 to 85% by weight of the solid composition, the proportion of alkali metal carbonate is about 0 to 25%, the proportion of permanganate compound is about 2 to 45%, and the proportion of fluoride compound is about 1 to 15%.

To more readily facilitate the further oxidation or conditioning of the heat scale for subsequent removal of said heat scale by acid treatment, and also for removal of carbon deposits where the latter two types of deposits are commingled, as is often the case, I preferably pretreat the parts to be descaled in a highly alkaline solution having a composition described in my copending application Serial No. 511,096.

Such alkaline solutions preferably contain from about 10% to about 25% of alkali metal hydroxide based on the weight of the solution. In such highly alkaline solutions are incorporated compounds in the form of certain soluble complexing salts, to act in conjunction with the alkali. These salts are derived from an aliphatic hydroxy acid such as lactic, citric, tartaric, gluconic, glyceric, malic, glycollic acid, and saccharic acid. These salts or mixtures of these salts may be employed for the above purpose. Low molecular weight fatty acid such as acetic or propionic acid may also be employed. These latter salts, however, are not as useful in such solutions as are the salts of the hydroxy acids referred to above. They may be used effectively particularly if used together with the hydroxy acids. The soluble salts of the above acids are employed, preferably employing the potassium or sodium salt, for example, potassium or sodium acetate or potassium or sodium glycollate. The quantity of these complexing salts added to the solution may vary, but generally from about 1 to about 45% by weight of such salts can be present in the treating solution in water, amounts of about 4 to about 40% usually being employed. These salts can be used separately or in admixture with each other.

Also, alkanolamines are employed in the above alkaline solutions containing the salts of the aliphatic hydroxy acids or low molecular weight fatty acids. As alkanolamines the polyalkanolamines are preferably employed, particularly those which form stable dispersions or solutions in the water system of the composition at the operating temperatures of 200 to 300° F. and are not decomposed by pyrolysis at such temperatures under the conditions of proposed use. Examples of suitable polyalkanolmonoamines with their boiling points and vapor pressures (at 20° C.) of the pure compounds are set out below.

| Name | Boiling Pt. at 760 mm. pressure | | Vapor Pressure, mm. Hg at 20° C. |
|---|---|---|---|
| | ° C. | ° F. | |
| Diethanolamine | 250 | 480 | less than 0.01. |
| Triethanolamine | 360 | 680 | Do. |
| N-aminoethyl ethanolamine | 244 | 471 | Do. |
| N-methyl diethanolamine | 247 | 476 | Do. |
| N-ethyl diethanolamine | 252 | 485 | Do. |
| Diisopropanolamine | 249 | 480 | Do. |
| Triisopropanolamine | 306 | 583 | Do. |

Other suitable polyalkanolmonoamines are N,N-dihydroxy-ethyl glycine, and glycol or polyglycol derivatives of triethanolamine and polyetherglycol derivatives of triethanolamine having the general constitutional formula

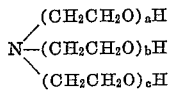

where $a+b+c$ equals from 3-6, both inclusive.

I may also use polyalkanolpolyamines having boiling points above 400° F. and similar low vapor pressures such as the polyalkanolpolyamines referred to below. Polyalkanolpolyamines may be used in the place of the polyalkanolmonoamines in like weight proportions or employ the polyalkanolpolyamines together with the polyalkanolmonoamines in the ratio and manner described hereinbelow to assist and improve the carbon and heat scale removal.

In preferred practice a polyalkanolpolyamine is also incorporated with the polyalkanolmonoamine. When using the polyalkanolpolyamines, a substantial proportion of the heat scale is in many cases removed. When the heat scale is tightly adherent refractory and particularly if glazed over the treatment in these alkaline solutions conditions the scale so that it is completely and cleanly removed by the subsequent treatment with the alkaline permanganate fluoride solution of the invention. The amount of the polyalkanolpolyamines to be added is decreased by employing the polyalkanolpolyamines together with the polyalkanolmonoamines. The result is an improvement in over-all cleaning ability and performance particularly in the rate of removal of the heat scale and also carbon.

Examples of suitable polyalkanolpolyamines for purposes of the invention are as follows:

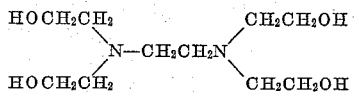
Tetra-kis N-(2-hydroxyethyl) ethylenediamine and

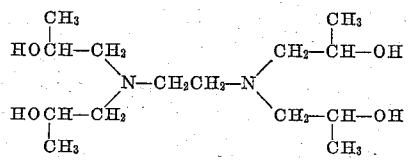
Tetra-kis N-(2-hydroxypropyl) ethylenediamine

Additional examples are N,N'-dihydroxyethyl ethylene diamine, tetraethanol propylene diamine, pentaethanol diethylenetriamine and hexaethanol triethylenetetramine. Substituted polyalkanolpolyamines may be used. Preferably, however, they should not be so extensively substituted as to disadvantageously impair their solubility and stability in the alkaline solution or to disadvantageously alter their characteristics as a polyalkanolpolyamine. Thus, where one or more than one of the alkanol groups is replaced by a carboxyl group, I may use, for example, Di N-hydroxyethyl ethylene diamine diacetic acid and N,N dihydroxyethyl glycine. The preferred compounds of this type are the polyalkanoldiamines, in particular, N,N,N',N'tetra-kis (2-hydroxypropyl) ethylenediamine and the 2-hydroxyethyl analog.

The amount of alkanolamine, which may also include both polyalkanolmonoamine and polyalkanolpolyamine, is usually in the range of about 5 to about 25%, by weight of the solution with about 10 to 25% preferred.

Phenols in the form of alkali metal phenates such as the potassium and sodium phenates may also be added, if desired, to the above alkaline solution containing complexing salt and alkanolamine. Thus, the phenols, i.e., the monatomic phenols are suitable such as hydroxybenzene and its homologues including cresol and cresylic acid, polyatomic phenols such as the dihydroxybenzenes and its homologues, triatomic phenols such as pyrogallol and its homologues, and higher polyphenols, which are sufficiently acid to form salts with alkali at the concentrations employed which are soluble in these aqueous compositions at the temperature of the treatment, to wit, at 200–300° F. The alkali metal salts which are effective in this respect are the salts of phenol itself, the ortho, meta and para dihydroxy benzenes, and of the trihydroxy benzenes such as pyrogallic acid. These materials are generally compatible with my alkali solutions. Hence, such materials can be employed as additive to the treating reagent. Such phenates may be employed in amounts ranging up to about 20% by weight of the alkaline solution, generally about 3 to 15%.

The above alkali solution containing a salt of a hydroxy aliphatic acid or the sale of a low molecular weight fatty acid and alkanolamine is effective for both carbon and heat scale removal.

Following treatment of the parts containing heat scale in my permanganate-fluoride solution, preferably preceded by the treatment with the above described alkaline solution containing alkanolamine, to thus remove a substantial proportion of the heat scale and loosen the remainder for easy subsequent removal, I treat the parts in a solution which will (1) solubilize the manganese dioxide stain or form a complex therewith for its removal and (2) remove or wash away any loose heat scale still adhering to the part surface. Such solution is one which is safe on the base metal of the part being processed. The after-treating solution may be acidic or alkaline, depending, for example, on the amount of heat scale remaining on the part. In preferred practice acid after-treating baths are employed, for example, aqueous solutions of nitric acid. The concentration and type of acid material used is chosen so that it is safe, that is, substantially non-corrosive to the base metal, while functioning to remove and dissolve the heat scale which has been conditioned to facilitate removal in my alkaline permanganate fluoride-containing bath. Preferably I employ as after-treatment bath an aqueous solution of nitric acid, e.g., equivalent to from 10 to 40% by volume of 42° Bé. nitric acid, such as 35% by volume of such acid.

Temperature of such after-treatment bath may vary from room temperature say to about 120° F., treatment at ambient room temperature generally being found satisfactory for obtaining removal of heat scale in a relatively short period. Time of treatment in this bath, such as the aqueous nitric acid bath, may vary from about 5 to 30 minutes, e.g., about 15 minutes. If desired, additives may be incorporated in the aqueous acid solution, e.g., other acidic materials and wetting agents, e.g., aryl alkyl sulfonates, to further enhance the effectiveness of the bath.

Where most of the heat scale has been removed from the engine part by treatment in the alkaline permanganate-fluoride bath, I may thereafter treat the parts in an alkaline solution mainly to remove the smut or manganese dioxide stain formed on the parts to obtain clean bright parts. Such alkaline solution may be any type of solution which will form a complex with manganese to solubilize and remove the manganese dioxide stain, and which is safe on the metal part. Thus, I may employ for this purpose the highly alkaline alkanolamine solution of my above copending application Serial No. 511,096 for this purpose. Also, I can employ for this purpose alkaline rust removing compositions such as disclosed in the copending application Serial No. 511,099, filed May 25, 1955, by Arden and Clark and assigned to the assignee of the instant application; for example, a solution formed by dissolving about two pounds of the following dry powder composition in one gallon of water:

| | Percent by weight |
|---|---|
| Sodium hydroxide | 68.7 |
| Triethanolamine | 17.6 |
| Sodium glycolate | 1.7 |
| Sodium gluconate | 5.5 |

Following treatment in the above noted bath, the parts are then rinsed free of adhering acid or alkaline solution.

As illustrations but not as limitations of the invention, the following are given by way of example.

EXAMPLE 1

The following compositions were prepared:

| Composition (1) | Solution | |
|---|---|---|
| | Oz./gal. | Percent by Weight |
| Sodium hydroxide | 18 | 9.8 |
| Sodium carbonate | 18 | 9.8 |
| Potassium permanganate | 8.5 | 4.6 |
| Water | 1 gal. | 75.8 |

| Composition I | Solution | |
|---|---|---|
| | Oz./gal. | Percent by Weight |
| Sodium hydroxide | 18 | 11.7 |
| Sodium carbonate | 18 | 11.7 |
| Potassium permanganate | 8.5 | 5.5 |
| Potassium fluoride | 4 | 2.6 |
| Water | 1 gal. | 68.5 |

Turbine buckets of Stellite 31 alloy (a cobalt base alloy) from a PRT (power recovery turbine) and coated with heat scale were first treated in a solution of the following composition A for 30 minutes, the solution being formed by dissolving 32–48 ounces of composition A in one gallon of water.

Composition A:      Wt. percent by solution
     Sodium hydroxide _____ 80
     Sodium acetate _____ 6
     Potassium acid tartrate _____ 12
     Alkyl benzene sodium sulfonate _____ 2 where the alkyl group has 7 to 10 carbon atoms.

The parts were then subjected to treatment in a solution of the following composition B for 90 minutes.

Composition B:      Wt. percent by solution
     Potassium hydroxide _____ 38
     Triethanolamine _____ 13.7
     Tetra-kis N-(2-hydroxypropyl)
        ethylenediamine _____ 2.6
     Acetic acid _____ 3.8
     Hydroxy acetic acid _____ 21.0
     Phenol _____ 4.7
     Potassium acid tartrate _____ 0.2
     Water _____ 16.0

Some of the parts were then treated in the conventional prior art composition (1) at 210° F. for 90 minutes, while the remainder of these parts were treated in composition I of the invention at 210° F. for 90 minutes.

The parts were then removed from compositions (1) and I, respectively, all the parts were rinsed, and then treated in an acid solution of 35% by volume of 42° Bé. nitric acid for 30 minutes, and all the parts were then rinsed.

Those parts treated in the prior art alkaline permanganate solution (1) were observed to be 30% descaled (that is 30% of the original heat scale on these parts was removed), whereas those parts treated in the alkaline permanganate solution I containing potassium fluoride were observed to be 60% descaled. Hence in the same total schedule of about 4 hours over-all treatment, by employing the alkaline permanganate-fluoride-containing conditioner bath of the invention, twice as much of the heat scale was removed in the same period, than by using the conventional alkaline permanganate bath in the absence of fluoride.

EXAMPLE 2

The following compositions were prepared:

| Composition IIA | Solution | |
|---|---|---|
| | Oz./gal. | Percent by Weight |
| Sodium hydroxide | 18 | 11.7 |
| Sodium carbonate | 18 | 11.7 |
| Potassium permanganate | 8.5 | 5.5 |
| Potassium fluoride | 4.0 | 2.6 |
| Water | balance | balance |

| Composition IIB | Solution | |
|---|---|---|
| | Oz./gal. | Percent by Weight |
| Sodium hydroxide | 18 | 11.7 |
| Sodium carbonate | 18 | 11.7 |
| Potassium permanganate | 8.5 | 5.5 |
| Potassium fluoride | 8.0 | 5.2 |
| Water | balance | balance |

Parts composed of 17–7 PH steel alloy, heat treated at 1750° F. and encrusted with oxide heat scale were first treated for 30 minutes in Solution B of Example 1, then some of the parts were treated in the conventional solution composition (1), some parts were treated in composition IIA, and the remainder of the parts treated in composition IIB, the time of treatment in each of these three latter baths being 30 minutes, and the temperature of such baths being 77° F.

Then all the parts were removed, rinsed and treated for 15 minutes at room temperature in a solution containing 35% by volume of 42° Bé. nitric acid.

The parts treated in the prior art permanganate solution (1) containing no fluoride were 55 to 60% descaled (that is, 55 to 60% of the heat scale was removed), the parts treated in composition IIA of the invention containing 4 ounces per gallon of KF were 75 to 80% descaled, and the parts treated in composition IIB of the invention containing 8 ounces per gallon of KF were 90 to 98% descaled. It is thus seen that a substantial improvement in removal of heat scale was observed on those parts treated with the permanganate-fluoride compositions of the invention as compared to the conventional permanganate bath not containing fluoride, and in the case where 8 ounces of KF was employed per gallon of solution (composition IIB) practically complete descaling (90 to 98%) was achieved compared to only 55 to 60% descaling for the prior art composition (1).

EXAMPLE 3

The following compositions were prepared:

Composition III:                                     Oz./gal.
    Sodium hydroxide _____ 32
    Potassium permanganate _____ 24
    Potassium fluoride _____ 8

| Composition IV | Oz./gal. | Proportions in dry compositions |
|---|---|---|
| Sodium hydroxide | 25.8 | 45.6 |
| Potassium hydroxide | 7.5 | 13.2 |
| Potassium permanganate | 17.5 | 30.9 |
| Sodium fluoride | 5.8 | 10.3 |
| Water | 1 gal. | |

| Composition V | Oz./gal. | Percent in solution | Percent in dry compound |
|---|---|---|---|
| Sodium hydroxide | 20.0 | 10.6 | 35.2 |
| Potassium hydroxide | 15.0 | 7.9 | 26.4 |
| Potassium permanganate | 16.0 | 8.5 | 28.2 |
| Sodium fluoride | 5.8 | 3.1 | 10.2 |
| Water | 1 gal. | balance | |

The following Table I indicates the results of performance of composition V versus composition (1) for descaling of jet engine hot section components (J–47 turbine buckets and J–42 turbine buckets).

Table 1

SCHEDULE A

Solution B _____ 60 min.
Composition (1) _____ 60 min.
35% vol. 42° Bé. nitric acid _____ 20 min.
Total process time _____ 140 min.
J–47 turbine buckets _____ 99% descaled.
J–42 turbine buckets _____ 100% descaled.

SCHEDULE B

Solution B _____ 30 min.
Composition V _____ 60 min.
35% vol. 42° Bé. nitric acid _____ 20 min.
Total process time _____ 110 min.
J–47 turbine buckets _____ 99% descaled.
J–42 turbine buckets _____ 100% descaled.

Composition V achieved complete descaling while permitting decrease in process time by about 20%.

Where the parts were treated according to Schedule A but the parts were subjected to the action of Solution B for only 30 minutes, as in Schedule B, J–47 turbine buckets were 88% descaled and J–42 turbine buckets 85% descaled, compared to 99% and 100% descaling respectively, according to Schedule B for the same time period of 110 minutes.

SCHEDULE C

Solution B _____ 60 min.
Composition V _____ 40 min.
35% vol. 42° Bé. nitric acid _____ 20 min.
Total process time _____ 120 min.
J–47 turbine buckets _____ 100% descaled.

Process time reduction over Schedule A employing composition (1) equals 20 minutes (or 15%). Where the parts were treated according to Schedule C but composition (1) is employed instead of composition V, the parts were 90% descaled.

It is to be understood that the comparisons made in Examples 2 and 3, using alkali metal permanganate solutions with and without fluoride have no relation to the results given in the treatments described in my copending application Serial No. 511,096, e.g., Table V thereof, since comparisons are only valid when made on substantially identical parts having substantially identical heat scale deposits, such parts resulting from simultaneous operation in engines with identical thermal histories, identical alloys and identical surface conditions prior to thermal operations. The parts tested in the instant application were not identical in these respects with the parts used in my copending application Serial No. 511,096, particularly in connection with the tests, results of which are reported in Table V thereof.

EXAMPLE 4

The following composition was prepared:

| Composition VI | Oz./gal. | Percent in solution | Percent in dry compound |
|---|---|---|---|
| Potassium hydroxide | 43.2 | 22.8 | 72.8 |
| Potassium permanganate | 12.0 | 6.2 | 19.8 |
| Sodium fluoride | 5.6 | 2.3 | 7.4 |
| Water | balance | balance | |

Comparative performance tests were made as between composition VI and composition (1) of the prior art for descaling J–47 and J–42 jet engine buckets, as shown in Table 2 below.

Table 2

SCHEDULE A

Solution B _____ 40 min.
Composition (1) _____ 50 min.
35% vol. 42° Bé. nitric acid _____ 15 min.
J–47 buckets _____ 84% descaled.
J–42 buckets _____ 93% descaled.

SCHEDULE B

| | |
|---|---|
| Solution B | 40 min. |
| Composition VI | 50 min. |
| 35% vol. 42° Bé. nitric acid | 15 min. |
| J-47 buckets | 93% descaled. |
| J-42 buckets | 99% descaled. |

It was noted from Table 2 that for the same overall period of treatment of 1 hour and 45 minutes, when using my permanganate-fluoride composition VI, improved descaling was achieved (93% for J-47 buckets and 99% for J-42 buckets) as contrasted to 84% and 93%, respectively, employing the conventional alkaline permanganate solution composition (1) in the absence of fluoride.

EXAMPLE 5

Comparative descaling tests were made on 6" x 1" test panels of PWA alloy 673 (a nickel base alloy) heat treated at about 1800° F. in a reducing atmosphere and having heat scale deposited thereon.

Some of these heat treated panels were immersed for one hour in the solution of composition (1) of Example 1, at 210° F., and then rinsed in a water spray. The remaining heat treated panels were treated under the same operating conditions but employing the solution of composition VI of Example 4. The panels treated in the prior art composition (1) were only 50% descaled, while those treated in composition VI of the invention were 95% descaled.

The above results show the marked improvement afforded by my alkaline permanganate-fluoride composition even without prior alkaline treatment of the parts.

The process and compositions hereof have the major advantage of providing substantially complete removal of heat scale or such extensive removal of the heat scale as to render the latter susceptible to easy removal by simple chemical follow-up in acid or alkaline solutions. As result of my novel compositions and process, a greater proportion of the heat scale can be removed than is ordinarily the case with conventional alkaline permanganate solutions for the same time period, or the same amount of heat scale can be removed according to the invention for a shorter period of treatment than when employing conventional permanganate solutions. Further, the alkali permanganate-fluoride composition of the invention has substantially no corrosive effect on the high temperature steel alloys processed therein. The process and compositions of the invention are also applicable to the removal of heat scale in the presence of carbon deposits.

The term "consisting essentially of" as used in the definition of the ingredients present in the compositions claimed is intended to exclude the presence of other materials in such amounts as to interfere substantially with the properties and characteristics possessed by the composition set forth but to permit the presence of other materials in such amounts as not substantially to affect said properties and characteristics adversely.

While I have described particular embodiments of my invention, it should be understood that various modifications and adaptations thereof may be made within the spirit of the invention as set forth in the appended claims.

I claim:

1. A composition of matter which when dissolved in water forms an alkaline solution suitable for removal or conditioning of heat scale from engine component parts, which consists essentially of alkali metal hydroxide, a soluble permanganate and a soluble fluoride which produces the fluoride ion in said alkaline solution.

2. A composition of matter which when dissolved in water forms an alkaline solution suitable for removal or conditioning of heat scale from engine component parts, which consists essentially of a substantial proportion of alkali metal hydroxide, a soluble permanganate and a minor proportion of a soluble fluoride-containing compound which forms the fluoride ion in said alkaline solution.

3. A composition of matter which when dissolved in water forms an alkaline solution suitable for removal or conditioning of heat scale from engine component parts, which consists essentially of alkali metal hydroxide, a soluble permanganate and a minor proportion of a complex inorganic fluoride which decomposes in said alkaline solution to produce the fluoride ion.

4. A composition as defined in claim 1, wherein said permanganate is an alkali metal permanganate.

5. A composition as defined in claim 1, wherein said soluble inorganic fluoride is a member of the group consisting of alkali metal and ammonium fluorides, alkali metal and ammonium silicofluorides and alkali metal and ammonium fluoborates.

6. A solid composition of matter which when dissolved in water forms an alkaline solution suitable for removal or conditioning of heat scale on engine component parts, which consists essentially by weight from about 15 to 85% alkaline metal hydroxide, 0 to about 25% alkali metal carbonate, about 2 to 45% of a soluble permanganate, and about 1 to 15% of a soluble fluoride which produces the fluoride ion in said alkaline solution.

7. A solid composition of matter which when dissolved in water forms an alkaline solution suitable for removal or conditioning of heat scale from engine component parts, which consists essentially of by weight from about 15 to 85% sodium hydroxide, about 2 to 45% potassium permanganate and about 1 to 15% alkali metal fluoride.

8. An aqueous alkaline solution suitable for removal or conditioning of heat scale on engine component parts, which consists essentially of from about 1 to about 25% alkali metal hydroxide, 0 to about 15% alkali metal carbonate, about 0.4 to about 12% of a soluble permanganate, and about 1 to about 8% of a soluble fluoride which produces the fluoride ion in said alkaline solution, said percentages being based on the weight of the solution.

9. A solution as defined in claim 8, wherein said soluble permanganate is alkali metal permanganate.

10. A composition as defined in claim 8, wherein said soluble fluoride is alkali metal fluoride.

11. A solution as defined in claim 8, wherein said soluble permanganate is alkali metal permanganate and said fluoride is alkali metal fluoride, the alkali metal hydroxide being present in an amount of about 10 to about 25%, the alkali metal permanganate being present in an amount of about 3 to about 9%, and the alkali metal fluoride in an amount of about 2 to about 6%, based on the weight of the solution.

12. An aqueous alkaline solution suitable for removal or conditioning of heat scale on engine component parts, which consists essentially of an alkali metal hydroxide, an alkali metal permanganate, and a soluble fluoride which produces the fluoride ion in said alkaline solution.

References Cited in the file of this patent

UNITED STATES PATENTS

| | | |
|---|---|---|
| 1,503,443 | Gravel | July 29, 1924 |
| 1,553,724 | Shetzley | Sept. 15, 1925 |
| 1,553,881 | Siegel | Sept. 15, 1925 |
| 1,572,848 | Porter et al. | Feb. 9, 1926 |
| 1,859,734 | Massapequa | May 24, 1932 |
| 1,899,734 | Stockton | Feb. 28, 1933 |
| 2,347,742 | Keene | May 2, 1944 |
| 2,514,304 | Bacon et al. | July 4, 1950 |
| 2,567,835 | Alquist et al. | Sept. 11, 1951 |